June 10, 1924.
J. C. MEYERS
INDIVIDUAL PACKAGE ICE CREAM PACKER
Filed Jan. 7, 1922
1,497,528
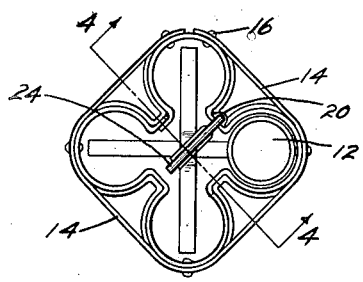
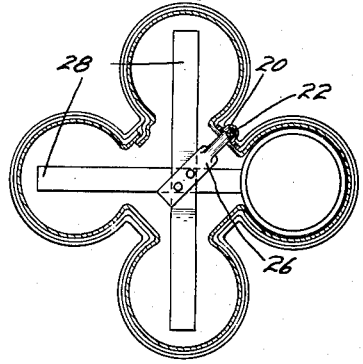
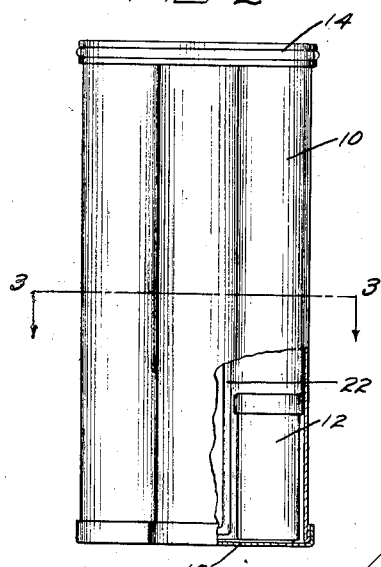
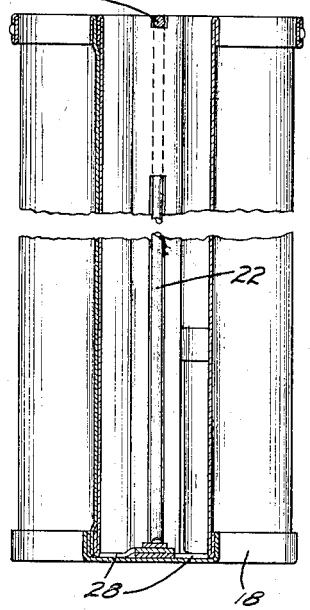
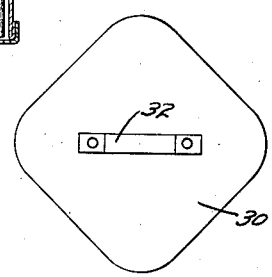
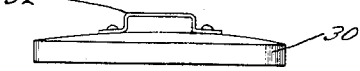

Patented June 10, 1924.

1,497,528

UNITED STATES PATENT OFFICE.

JAMES C. MEYERS, OF RED OAK, IOWA.

INDIVIDUAL-PACKAGE ICE-CREAM PACKER.

Application filed January 7, 1922. Serial No. 527,681.

*To all whom it may concern:*

Be it known that I, JAMES C. MEYERS, a citizen of the United States, residing at Red Oak, in the county of Montgomery, in the State of Iowa, have invented a new and useful Individual-Package Ice-Cream Packer, of which the following is a specification.

This invention relates to improvements in ice cream packers or the like, and has for one of its principal objects the provision of such a device wherein a plurality of individual packages of ice cream or similar material may be retained in good condition for quite a considerable period of time.

Another object of this invention is the provision of an ice cream packer adapted to retain in assembled position a plurality of individual ice cream packages and provided with means whereby these packages may be readily removed from the same at will.

Another important object of this invention is the provision of an ice cream packer or the like adapted to retain in compact, assembled relation a plurality of cardboard containers, preferably of cylindrical form; whereby these containers may be readily handled as a single unit.

A still further important object of this invention is the provision of an ice cream packing device wherein a plurality of containers filled with ice cream or the like are maintained in assembled relation and adapted to be completely surrounded by a freezing mixture whereby the contents of the container are always maintained in their frozen state, and which container is provided with means whereby any or all of the containers are rendered readily accessible for removal.

Other and further important objects of this invention will be apparent from the disclosures in the accompanying drawings and following specification.

The invention, in a preferred form, is illustrated in the drawings and hereinafter more fully described.

In the drawings:

Figure 1 is a top plan view of the improved device of this invention, looking down upon the same with the cover removed therefrom.

Figure 2 is a vertical elevation of the device, parts being broken away.

Figure 3 is a sectional view taken on the line 3—3 of Fig. 2 looking in the direction indicated by the arrow.

Figure 4 is a vertical section on the line 4—4 of Fig. 1 looking in the direction indicated.

Figure 5 is a top plan view of the cover of the apparatus.

Figure 6 is a side elevation of the cover.

As shown in the drawings:

The reference numeral 10 indicates the container made in four sections, each practically cylindrical in form, but with its inner side open so as to co-act with the remaining sections. This container is preferably made of a single piece of galvanized sheet iron or the like, but if desired may be formed of several pieces spot-welded or soldered together. Each of these cylindrical sections is adapted to contain a plurality of containers 12 usually composed of cardboard or the like properly water-proofed and adaped to contain ice cream or any similar substance.

A retaining band 14 is provided around the top of the container 10 and is attached thereto by rivets or the like 16 whereby this band is securely held in position and the whole device is rendered a strong integral unit. If desired, a similar band or strap may be provided at the bottom of the container, but as it has been found in practice that this band interferes more or less with the free removal of the freezing mixture of ice and salt from the outside of the container, it has been eliminated and the bottom is preferably formed of a single stamped unit as shown at 18 and spot-welded or soldered into position, whereby a particularly strong and durable construction is obtained.

Slideably mounted in a semi-cylindrical or cylindrical sleeve 20 provided therefor in one of the recesses between adjacent portions of the container is a vertically extending rod 22 provided with a horizontal handle or the like 24 and terminating at its bottom portion in a horizontally extending ledge preferably flattened as shown at 26. This ledge 26 has attached thereto by means of rivets or the like a pair of cross-arms 28, the ends of the arms extending into the four sections of the container respectively. One of the arms 28 is bent, as best shown in Fig. 4, in order to have their lifting device properly co-act with the bottom 18 of the container and fit smoothly under the lowermost package 12 whereby the same may be conveniently raised to the top of the device for ready removal.

The container 10 is provided with a top 30 adapted to fit snugly thereon and provided with a handle 32. The top of the cover 30 is preferably formed of a convex shape as best shown in Fig. 6 whereby a stronger construction is attained. As best shown in Fig. 4 the rod 22 is slideably encased in the retaining sleeve 20 for only a portion of its length, as in this way the possibility of sticking is eliminated.

It will be seen that herein is provided a device adapted to efficiently retain in compact, assembled relation a plurality of packages such as are usually provided for the distribution of ice cream or the like, and is of such construction that the packages will be securely retained thereby in proper relation to each other and free from any liability to damage or bursting. This is due principally to the snug fit of the packages 12 in the cylindrical sections of the casing 10.

Moreover, the packages can be readily removed from the container whenever desired by simply lifting the rod 22 by means of its handle 24, which automatically raises the cross pieces 28 under the lowermost package, and in this manner the entire four columns of packages may be brought into readily removable position at the top of the case.

The packages, usually twelve in number, but which, it is obvious, may be varied to meet the particular requirements of the shipper, are readily transferred in the container from place to place without any danger of breakage or damage in transit. The container itself may then be placed as a single unit into the freezing mixture provided by the retail dealer and the individual packages containing the ice cream dispensed therefrom without any of the trouble or annoyance usually attendant upon the packing and handling of ice cream as is ordinarily practiced. Further, it is evident that the size of the entire device may be readily varied to correspond with the size of the individual packages, and further, if desired, provision may be made in the center thereof for an additional column of packages whereby five columns may be conveniently handled.

I am aware that many changes may be made and numerous details of construction varied without departing from the principles of this invention, and I therefore do not purpose limiting the patent granted hereon otherwise than as necessitated by the prior art.

I claim as my invention:

1. A container for cylindrical packages including a plurality of adjacent cylinders with axes equidistantly positioned from the center of the container and each adapted to contain a number of packages, and a single lifting member reciprocating concurrently in each of said cylinders.

2. A container for cylindrical packages including a plurality of adjacent cylinders with axes equidistantly positioned from the center of the container and each adapted to contain a number of packages, said container being composed of a single sheet of material whereby all of the containing cylinders open into a common central space and a single lifting member for concurrently engaging the packages in each of said cylinders.

3. A container for cylindrical packages including a plurality of adjacent cylinders, with axes equidistantly positioned from the center of the container and each adapted to contain a number of packages, said container being provided with a centrally disposed slidable rod having radial arms whereby the packages may be vertically lifted from the container.

4. A container for cylindrical packages including a plurality of adjacent cylinders each adapted to contain a number of packages, and provided with means whereby the packages may be vertically lifted from the container, said means including a vertically extending slideable rod, and a sleeve for the rod on the container.

5. A container for cylindrical packages including a plurality of adjacent cylinders each adapted to contain a number of packages, and provided with means whereby the packages may be vertically lifted from the container, said lifting means including a vertical rod, a horizontal handle integral with the upper end thereof, and lifting members extending horizontally from the lower end thereof.

6. A container for cylindrical packages including a plurality of adjacent cylinders each adapted to contain a number of packages, and provided with means whereby the packages may be vertically lifted from the container, said lifting means including a vertical rod, a horizontal handle integral with the upper end thereof, and lifting members extending horizontally from the lower end thereof, each of said lifting members being adapted to co-act with a package-containing cylinder.

7. A device of the class described, including a unitary container adapted to maintain in assembled relation a plurality of individual packages by partial enclosure of such packages and provided with means operating in the open portion of said container for selectively removing a desired number of said packages.

8. A container for cylindrical packages including a plurality of adjacent cylinders each adapted to partially enclose a number of packages, and provided with means operating through the open portion of said cylinders whereby the packages may be simultaneously vertically lifted from the container.

In testimony whereof I have hereunto subscribed my name in the presence of two subscribing witnesses.

JAMES C. MEYERS.

Witnesses:
F. E. CRANOSA,
MARY LILLJEBERG.